3,267,162
FLUID BED OXYCHLORINATION OF ALIPHATIC HYDROCARBONS AND PARTIALLY CHLORINATED ALIPHATIC HYDROCARBONS
Lester E. Bohl, New Martinsville, W. Va., assignor to Pittsburgh Plate Glass Company, Pittsburgh, Pa., a corporation of Pennsylvania
Filed Feb. 13, 1963, Ser. No. 258,163
12 Claims. (Cl. 260—654)

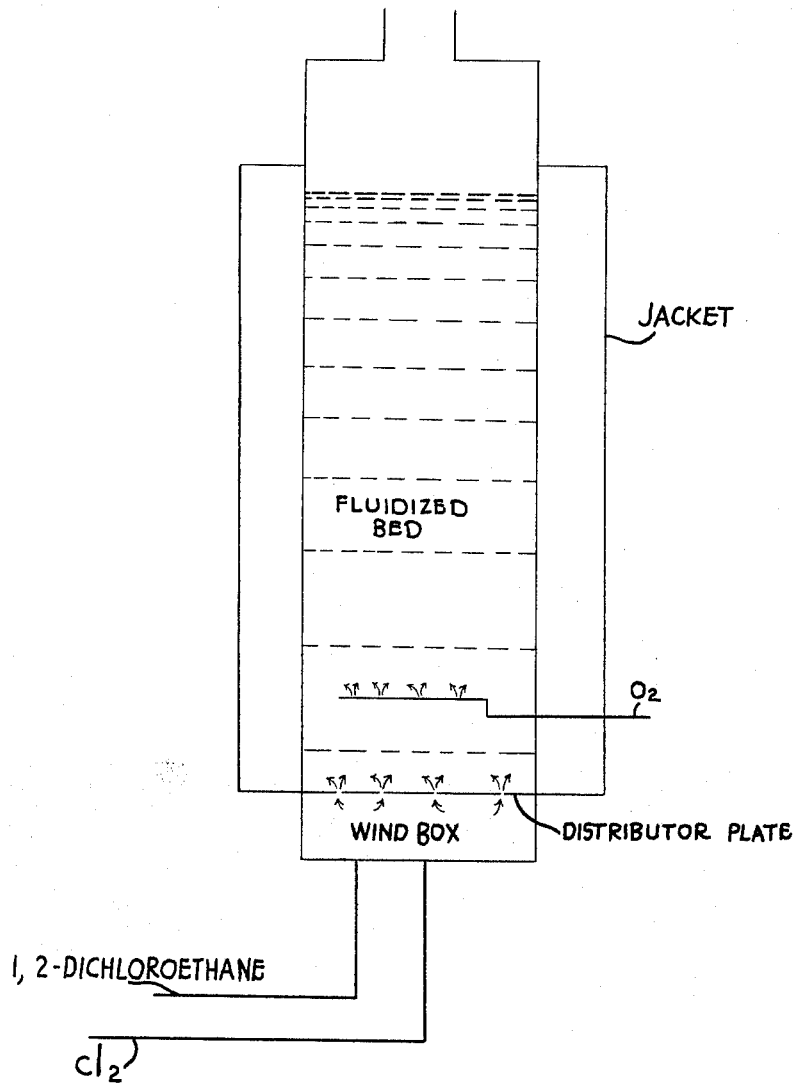

This application is a continuation-in-part of my copending application Serial No. 28,550, filed May 12, 1960 now forfeited.

The present invention relates to the production of chlorinated hydrocarbons. More particularly, the present invention relates to the production of chlorinated aliphatic hydrocarbons by fluid bed chlorinations utilizing chlorine values of hydrogen chloride.

Modified Deacon type chlorinations or oxychlorinations, as they are termed in the art, involve consuming and/or minimizing if not avoiding the generation of by-product hydrogen chloride. The attractiveness, of oxychlorinations is due to the fact that they utilize HCl by-product from conventional thermal or catalytic chlorination procedures.

These processes involve the chlorination of hydrocarbon or chlorohydrocarbon with hydrogen chloride and an oxygen containing gas such as air. The process takes place conveniently in the presence of a metal halide catalyst such as cupric chloride impregnated on a suitable carrier. It has been postulated that in these oxychlorinations the hydrogen chloride is oxidized to chlorine and water and the chlorine reacts with the organic. In one form of an oxychlorination, elemental chlorine is used as the feed source of chlorine. In this process, the hydrogen chloride is generated by the chlorination with the elemental chlorine of the hydrocarbon and/or chlorohydrocarbon. Thus, free chlorine, an oxygen containing gas and hydrocarbon and/or chlorohydrocarbon to be chlorinated are passed in contact with the metal halide catalyst. The chlorine reacts with the metal halide catalyst. The chlorine reacts with the hydrocarbon or chlorohydrocarbon to produce hydrogen chloride and a chlorinated product of the hydrocarbon or a more chlorinated derivative of the chlorohydrocarbon. The chlorine content of hydrogen chloride produced in this manner is utilized to achieve additional chlorinations of the hydrocarbon and/or chlorohydrocarbons present in the reaction zone.

In conducting oxychlorinations, many deleterious effects are often experienced. Thus, yields in the oxychlorination of aliphatic hydrocarbons and chlorohydrocarbons (in the presence of a metal halide catalyst utilizing either a chlorine or a hydrogen chloride feed material as the chlorinating agent) are undesirably low due to what may be regarded as burning of the organics. Further, during oxychlorination of aliphatic hydrocarbons and chlorohydrocarbons, low utilization of the chlorinating agent employed renders the process unattractive from the commercial standpoint. Utilization of the chlorinating agent for example is a measure of the amount of chlorine that is placed on the organic feed based on the chlorine fed to the system and may be calculated as follows:

Percent $Cl_2$ utilized =

$$\frac{[\text{free Cl fed} - (\text{HCl recovered} + \text{Cl recovered as free Cl})]}{\text{free chlorine fed}} \times 100$$

Still further, frequently, conversions of the organic feed material to desirable products are not sufficiently high to warrant the expense involved in conducting a catalytic oxychlorination process. These factors are especially true in fluidized bed operations, that is, reaction procedures involving the use of a catalytic reaction bed in which the particles are suspended by uprising gases and define within a reaction zone a clear upper bed limit.

It has been found in accordance with the present invention that many aliphatic hydrocarbons and chlorohydrocarbons may be successfully oxychlorinated to useful chlorohydrocarbons in a fluidized bed in such a manner that many of the difficulties experienced by the prior art are no longer bothersome. Thus, for example, it is possible to fluidize a bed of oxychlorination catalyst particles into which 1,2-dichloroethane, chlorine and/or HCl and an oxygen containing gas are being fed and achieve a satisfactory conversion of the 1,2-dichloroethane to perchloroethylene and trichloroethylene product. During the course of the reaction, oxidation or burning of the 1,2-dichloroethane feed material is maintained at a minimum. In addition, extremely high utilizations of the chlorinating agent are readily obtained.

In accordance with this invention, the material to be chlorinated, i.e., a lower aliphatic hydrocarbon containing from 1 to 4 carbon atoms and/or a partially chlorinated lower aliphatic hydrocarbon, and elemental chlorine and/or HCl are introduced into the lower part of a fluidized bed of oxychlorination metal halide catalyst particles. Oxygen is introduced into the bed at a level above that at which the hydrocarbon and chlorine and/or HCl are introduced while the gaseous products are withdrawn from an upper portion of the bed. During the reaction, the rate of flow of the chlorine and/or HCl, oxygen and the hydrocarbon and/or chlorohydrocarbon fed is maintained high enough to suspend at least the catalyst particles above the point of oxygen introduction into the resulting stream of upwardly rising gases. Operating in this manner, it is found that in the oxychlorination of hydrocarbons such as methane, ethane, propane, ethylene and chlorohydrocarbons such as 1,2-dichloroethane, tetrachloroethane, and other similar partially chlorinated aliphatic hydrocarbons, it is possible to maintain high utilization of the chlorinating feed materials while achieving adequate productivity and a minimized amount of losses due to oxidation and/or burning.

It has now been discovered that in the oxychlorination of a lower aliphatic hydrocarbon and/or a partially chlorinated derivative thereof, it is an important consideration that at least a major portion of the oxygen requirements of the process be introduced at a level in the bed substantially above the introduction point of the hydrocarbon and chlorinating agent fed thereto. Thus, in oxychlorinating a lower aliphatic hydrocarbon and partially chlorinated derivatives thereof, the introduction of the main oxygen containing gas stream into the bed should be at a level in the bed at least 2 inches above the level of introduction of the hydrocarbon and the chlorine and/or HCl being introduced into said bed. Preferably, the main oxygen containing gas stream fed to the oxychlorination fluidized bed is located at a level above the bottom of the bed representing 3 to 33 percent of the total bed height and which is above the level of introduction of the hydrocarbon and the chlorinating agent introduced into the bottom of the reaction zone. The major portion of the oxygen containing gas stream, as utilized above and in the instant claims, is to be understood as embracing an oxygen containing gas stream which supplied to the fluidized reaction zone at least 75 percent of the oxygen consumed in the oxychlorination of the hydrocarbon and/or chlorohydrocarbon feed material to oxidize the HCl present in the bed to water and elemental chlorine. Thus, if desired, up to about 25 percent of the oxygen requirement for a given oxychlorination reaction may be introduced into the bed with the hydrocarbon and elemental chlorine and/or HCl fed thereto but at least 75 percent of the oxygen required for the oxychlorination is introduced at a point or level at least 2 inches above the introduction point or level of the hydrocarbon and chlorinating feed material. This 75 percent quantity of oxygen may be fed at one point or level or at varying levels. Thus, if desired several oxygen inlets or feed points may be supplied to the bed to supply the major portion of the oxygen to the bed, so long as these points are located above the level of the level of hydrocarbon and chlorinating agent introduction level.

The term "oxygen containing gas" as used herein in the specification and claims refers to oxygen or a mixture of gases which are not reactive under process conditions and which contain elemental oxygen therein. Thus, oxygen enriched air, elemental oxygen, or air mixed with inert gases or vapors, or mixtures of oxygen, air, and inert gases or vapors may be conveniently utilized in accordance with the teachings of the present invention. In the preferred operation, elemental oxygen is conveniently employed as the oxygen containing gas. The quantity of oxygen employed in the oxychlorination reaction or zone, in accordance with the teachings of the instant invention, is that quantity on a stoichiometric basis which will be required to oxidize the HCl contained in the zone to water and elemental chlorine in accordance with the following formula:

$$2HCl + \tfrac{1}{2}O_2 = H_2O + Cl_2$$

The instant invention is conducted by passing the gaseous reactants at varying velocities upward through a bed of finely-divided solid catalyst containing particles. When a gas is passed through a bed of solid material, several different conditions may be established depending upon the gas velocity, size of particles, etc. Thus, if the gas velocity is low, the bed of solids remains practically static; the gas simply passes through the bed pores. On the other hand, as the gas velocity is increased, at least some of the particles become dynamically suspended in the upwardly rising gas stream. As a result, the bed height expands. Such beds are termed "dynamic beds." If the gas velocity is still further increased, the particles all become suspended and the bed expands even further. Ultimately, the bed may assume a highly turbulent condition which in many ways resembles a boiling liquid. The present process may be conducted with gas velocities that provide for dynamic and fluidized beds. The exact condition requisite to establishing such bed conditions depends upon such factors as the particle size of the bed components, the gas velocity, the density of the particles, etc. Wilhelm and Kwuak, Chemical Engineering Progress, volume 44, page 201 (1948), equate the various factors necessary for fluidizing the bed, and by following the principles therein discussed, the desired bed conditions may be provided.

The temperature of the fluidized reaction bed may be varied considerably in accordance with the practice and teachings of the present invention and will depend in some measure upon the particular hydrocarbon and/or chlorohydrocarbon fed thereto. Generally, reaction temperatures range between 570° F. and 930° F. Preferably, reaction temperatures within the bed of between 750° F. to 850° F. produce the most beneficial results for most lower aliphatic hydrocarbons and their partially chlorinated derivatives.

The contact times, that is, the residence time that the feed material is in the reactor, may be considerably varied during the oxychlorination reaction conducted in the beds. Thus, reaction contact times of from 4 to 25 seconds or even longer may be employed if desired. Generally, the contact time is regulated to provide for a residence time of the feed material in the reactor of between 5 and 12 seconds.

As will be readily understood, considerable heat is evolved during the oxychlorination reaction conducted as described above and some means is usually provided for cooling the zones of reactions so that effective temperature control over the reactions may be maintained. Such control is achieved readily by suitably jacketing reactors, by spraying of coolants into reaction zones, by the insertion of cooling coils into the reaction beds, and by the use of bayonet coolers and/or recourse to other similar type heat exchange apparatus which may be conveniently operated in connection with a fluidized bed reactor either alone or in combination. Effective utilization of such heat exchange equipment gives rise to a ready control of the temperature of the reactions taking place within the dynamic and/or fluid beds contemplated herein.

The catalyst employed for the oxychlorination reactions herein described may conveniently comprise any of the well known oxychlorination or Deacon type reaction catalysts impregnated on a suitable carrier or support. Catalysts of this type are as a rule metal halides, preferably chlorides of a multivalent metal such as copper, iron, chromium and the like. These metal halides, usually as chlorides, may be utilized alone or may be combined with other metals such as alkali metal chlorides and alkali earth metal chlorides or mixtures thereof. Generally speaking, any effective Deacon type metal halide catalyst will satisfactorily produce chlorinated hydrocarbons from the reactants being fed to the oxychlorination zone. A particularly effective catalyst for this reaction is a copper chloride-zinc chloride-calcium chloride mixed catalyst. It has also been found that a particularly effective catalyst for this operation, especially when the reactions are conducted at elevated temperatures, that is, temperatures within the range of 750° F. to 850° F., is a copper chloride-potassium chloride catalyst. In any event, the preferred catalyst employed is one which contains a substantial quantity of copper chloride thereon. By substantial quantity of copper chloride is meant a catalyst particle which contains thereon somewhere between 6 and 12 percent copper by weight.

Various carriers for the catalyst may be employed in conducting these reactions and materials such as silica, alumina, fuller's earth, kieselguhr, pumice, and other like materials have been employed. The selection of the particular type of carrier will depend in great measure upon the turbulence of the bed, velocity of the gases, tolerable quantities of burning, and other similar consideration. Thus, a particularly effective carrier particle for utilization in the fluid beds contemplated herein is Florex, a treated fuller's earth manufactured by the Floridin Corporation.

Any technique may be employed for placing the catalyst material upon the carrier, but preferably the process employed will be that found to accomplish the most uniform distribution of catalytic material upon the carrier. Thus, carrier materials may simply be immersed in solutions containing the catalytic components and the water of solution evaporated from the carrier particles upon their removal from the solution. If desired, the catalytic material may be sprayed upon the particles in mixing devices such as rotating tumblers, mix-mullers and the like. Another effective method for impregnating carrier particles with the catalyst material is to spray into a fluidized bed of the carrier particles a solution containing the catalyst. During the fluidization and impregnation of the carrier particles, heat is applied to the fluidized bed by means of hot, inert gases to vaporize the water solution therefrom and leave behind a fluidized bed of carrier particles uniformly impregnated with the catalytic material to be employed.

In connection with the operation of the fluidized beds in accordance with this invention, considerable reductions in the quantities of organic material which is oxidized or burned during the reaction may be realized by the employment in the fluidized bed of considerable quantities of inert materials such as sand. Generally, dilution of the fluidized catalytic beds with sand particles is regulated so that on a volume basis the catalytic bed does not contain more than 50 percent sand or diluent. While diluents effectively reduce burning, it is of course to be understood that operation of the beds may be conducted without the use of such diluents and in accordance with this invention, since the regulation of oxygen feed permits adequate utilization of all materials fed to the reaction zone with a tolerable amount of burning being experienced.

The oxychlorination fluidized bed operations conducted as above described, may be conducted under atmospheric conditions of pressure or, if desired, may be conducted under conditions of considerable pressure. Thus, if desired, pressure may be applied to the oxychlorination reaction being conducted in the fluidized bed to thereby give rise to increased productivity.

Reaction products are collected from the upper portion of the fluidized beds and removed from the reaction zone. Usually, the upward flow of gases sweep out the products of reaction along with any unreacted or inert constituents. The reaction products from these operations are comprised of various chlorinated organic derivatives of the hydrocarbon and/or chlorohydrocarbon fed to the reaction zone. Generally, the organic products are condensed and/or absorbed and after purification and water removal steps following the conventional practices of the art, the desired organic chlorinated hydrocarbon products are separated from each other by recourse to fractional distillation, selective absorption and desorption operations and other like separation processes.

For a more complete understanding of the instant invention, reference is made to the following examples which are illustrative of the modes of operating fluidized bed processes for the oxychlorination of hydrocarbons and chlorohydrocarbons in accordance with the teachings of this invention:

EXAMPLE I

A catalyst was prepared by dissolving 1,316 grams of $CuCl_2 \cdot 2H_2O$ and 688 grams of $KCl$ in 2,000 milliliters of water. This concentrated active solution was then poured evenly over 10 pounds of suitably sized (30 to 60 mesh) Florex particles (a calcined fuller's earth manufactured by the Floridin Corporation). The solution contained just enough water to thoroughly wet all the Florex particles. The wet catalyst particles were dried in a steam heated tray drier. The dried catalyst particles have a solids loading of 30.6% by weight of salts which corresponds to 7.5% copper and 5.5% potassium.

EXAMPLE II

A fluid bed reactor shown diagrammatically in the drawing and comprising a nickel pipe 6 feet long and 6 inches in diameter was employed for the oxychlorination reaction of ethylene, chlorine and $O_2$. The lower 5 feet of the reactor was surrounded by a 10 inch diameter steel piper having a reflux condenser attached thereto and containing circulating Dowtherm (a eutectic mixture of diphenyl and diphenyl oxide heat transfer manufactured by the Dow Chemical Company) therein. Strip heaters were placed around the bottom portion of the reactor to supply the necessary heat of reaction on start-up. Thermocouples to measure the temperature of the jackets of the gas feed lines in the reactor bed at the distributor plate and at levels 1, 2 and 3 feet above this plate were employed. Reactant gases to the reactor were passed through a jacketed steel vaporizer utilizing 175 pounds per square inch gauge of steam in the jacket. Through the vaporizer, ethylene was introduced into the reactor line. Chlorine was fed from a cylinder through a rotameter into the wind box through a 1 inch main feed line. Oxygen was introduced into the catalyst bed at a point located 14 inches above the distributor plate located above the wind box. A reactor feed of ethylene, chlorine, and oxygen in molar ratios of 1 to 2 to 1 were employed during the run. The pressure was varied during the reaction from 0 to 5 pounds per square inch gauge. The reaction temperatures in the fluidized bed were in the range of from 784° F. to 794° F. Contact time during the reaction was maintained at 9.8 seconds. Several runs were made utilizing these reactor conditions and the results are listed below in Table I. The catalyst of Example I was employed in the catalyst bed.

Table I

Production distribution, mole percent:

| | |
|---|---|
| $C_1Cl_4$ | 53.8 |
| $C_2HCl_3$ | 23.0 |
| $C_2H_4Cl_2$ | 2.6 |
| $C_2H_3Cl$ | 0.9 |
| $CHCl_3$ | 0.9 |
| $C_2H_2Cl_2$ | 5.1 |
| $C_2H_2Cl_4$ | 1.0 |
| $C_2HCl_5$ | 8.6 |
| $C_2Cl_6$ | 4.1 |
| $C_2H_4$ utilization _____ percent__ | 94.1 |
| $C_2H_4$ burned _____ do____ | 5.9 |
| $C_2H_4$ unreacted _____ do____ | 0 |
| $Cl_2$ utilized _____ do____ | 86.5 |

EXAMPLE III

Utilizing the apparatus of Example II, 1,2-dichloroethane, chlorine, and oxygen were fed to the reactor to produce perchloroethylene. The catalyst of Example I was employed in the catalyst bed. The temperature of the reactor was maintained at 800° F. and reactant materials fed to the reaction zone were maintained therein at a contact time of 9.5 seconds. 1,2-dichloroethane was fed through the steel vaporizer into the wind box of the oxychlorinator. Chlorine was passed from a cylinder through a rotameter into the wind box. A small quantity of air representing 10 percent of the required oxygen content to convert the HCl produced during the reaction to water and elemental chlorine was fed to the reactor at the wind box. Ninety percent of the oxygen requirement for the reaction was fed to the reaction zone through a distributor ring located 3 inches above the distributor plate located at the top of the wind box. Several runs were made under these reaction conditions utilizing atmospheric pressures as well as superatmospheric pressures and the results are listed below in Table II.

Table II

| Run | Fluid Bed Height in Inches | Reactor Pressure | Bed Temperature, ° F. | Mole Percent Recovery Based on Total Organics Fed | | | | |
|---|---|---|---|---|---|---|---|---|
| | | | | $C_2HCl_3$ | $C_2Cl_4$ | $C_2HCl_5$ | $CO+CO_2$ | $Cl_2$ Utilization Percentage |
| 1 | 60.0 | 5 | 779 | 13.7 | 59.4 | 10.9 | 5.1 | 71.5 |
| 2 | 60.0 | 15 | 796 | 20.2 | 54.6 | 6.3 | 3.5 | 82.0 |

The process may be conducted as described in Examples II and III utilizing HCl or mixtures of HCl and Cl$_2$ as the chlorinating agent in lieu of the chlorine shown in these examples, and similar results being readily attained.

While the invention has been discussed with reference to certain specific embodiments thereof, it is of course to be understood that it is not to be limited thereby, except insofar as appears in the accompanying claims. It has been found in operating fluidized beds, in accordance with the teachings of this invention, on other organic materials such as tetrachloroethane, ethane, and methane, that substantial utilization of all materials is readily accomplished and burning is reduced to a minimum.

I claim:

1. In a method of preparing chlorinated hydrocarbons in a bed of oxychlorination catalyst particles maintained at a temperature between 570° F. and 930° F. by reacting in said bed a member of the group consisting of chlorine, HCl and mixtures of chlorine and HCl with oxygen and a member of the group consisting of lower aliphatic hydrocarbons containing from 1 to 4 carbon atoms and partially chlorinated derivatives thereof, the improvement comprising introducing said members of said groups into the lower part of said bed, introducing oxygen into the bed at an intermediate level and above the level of introduction of the members of said groups, withdrawing products of the resulting reaction from the upper portion of the bed and maintaining the rate of flow of oxygen and the members of said groups high enough to suspend catalyst particles above the level of oxygen introduction in the resulting stream of uprising gases.

2. In a method of preparing chlorinated hydrocarbons in a bed of oxychlorination catalyst particles maintained at a temperature between 570° F. and 930° F. by reacting in said bed a member of the group consisting of chlorine, HCl and mixtures of chlorine and HCl with oxygen and a member of the group consisting of lower aliphatic hydrocarbons containing from 1 to 4 carbon atoms and partially chlorinated derivatives thereof, the improvement comprising introducing said members of said groups into the lower part of said bed, introducing oxygen into the bed at an intermediate level and above the level of introduction of the members of said groups, withdrawing products of the resulting reaction from the upper portion of the bed, and maintaining the rate of flow of oxygen and a member of said group high enough to completely suspend the catalyst particles contained in said bed.

3. In a method of preparing chlorinated hydrocarbons in a bed of oxychlorination catalyst particles maintained at a temperature between 570° F. and 930° F. by reacting in said bed a member of the group consisting of chlorine, HCl and mixtures of chlorine and HCl with oxygen and a member of the group consisting of lower aliphatic hydrocarbons containing from 1 to 4 carbon atoms and partially chlorinated derivatives thereof, the improvement comprising introducing said members of said groups into the lower part of said bed, introducing oxygen into the bed at an intermediate level in the bed above the bottom of the bed representing 3 to 33 percent of the total bed height and above the level of introduction of the members of said groups, withdrawing products of the resulting reaction from the upper portion of the bed and maintaining the rate of flow of the oxygen and a member of said group high enough to suspend the catalyst particles above the level of oxygen introduction into the resulting stream of upwardly rising gases.

4. In a method of preparing chlorinated hydrocarbons in a bed of oxychlorination catalyst particles maintained at a temperature between 570° F. and 930° F. by reacting in said bed a member of the group consisting of chlorine, HCl and mixtures of chlorine and HCl with oxygen and a member of the group consisting of lower aliphatic hydrocarbons containing from 1 to 4 carbon atoms and partially chlorinated derivatives thereof, the improvement comprising introducing said members of said groups into the lower part of said bed, introducing oxygen into the bed at an intermediate level in the bed above the bottom of the bed representing 3 to 33 percent of the total bed height and above the level of introduction of the members of said groups, withdrawing products of the resulting reaction from the upper portion of the bed and maintaining the rate of flow of the oxygen and a member of said group high enough to completely suspend the bed of catalyst particles.

5. In a method of preparing chlorinated hydrocarbons in a bed of oxychlorination catalyst particles maintained at a temperature between 570° F. and 930° F. by reacting in said bed a member of the group consisting of chlorine, HCl and mixtures of chlorine and HCl with oxygen and a member of the group consisting of lower aliphatic hydrocarbons containing from 1 to 4 carbon atoms and partially chlorinated derivatives thereof, the improvement comprising introducing said members of said groups into a lower portion of said bed, introducing oxygen into the bed at an intermediate level in the bed above the bottom of the bed representing 3 to 33 percent of the total bed height and above the level of introduction of the members of said groups, maintaining the temperature of the bed between 570° F. to 930° F., withdrawing products of the resulting reaction from the upper portion of the bed, and maintaining the rate of flow of oxygen and a member of said group high enough to suspend the catalyst particles above the level of oxygen introduction into the resulting stream of upwardly rising gases.

6. In a method of preparing chlorinated hydrocarbons in a bed of oxychlorination catalyst particles maintained at a temperature between 570° F. and 930° F., by reacting in said bed a member of the group consisting of chlorine, HCl and mixtures of chlorine and HCl with oxygen and a member of the group consisting of lower aliphatic hydrocarbons containing from 1 to 4 carbon atoms and partially chlorinated derivatives thereof, the improvement comprising introducing said members of said groups into the lower part of said bed, introducing oxygen into the bed at an intermediate level in the bed above the bottom of the bed representing 3 to 33 percent of the total bed height and above the level of introduction of the members of said groups, maintaining the bed at a temperature between 570° F. and 930° F., withdrawing products of the resulting reaction from the upper portion of the bed, and maintaining the rate of flow of oxygen and a member of said group high enough to completely suspend the bed of catalyst particles.

7. In a method of preparing chlorinated hydrocarbons in a bed of oxychlorination catalyst particles maintained at a temperature between 570° F. and 930° F. by reacting in said bed a member of the group consisting of chlorine, HCl and mixtures of chlorine and HCl with oxygen and a member of the group consisting of lower aliphatic hydrocarbons containing from 1 to 4 carbon atoms and partially chlorinated derivatives thereof, the improvement comprising introducing said members of said groups into the lower part of said bed, introducing a major portion of the oxygen for said reaction into the bed at an intermediate level in the bed above the bottom of the bed representing 3 to 33 percent of the total bed height and above the level of introduction of the members of said groups, withdrawing products of the resulting reaction from the upper portion of the bed and maintaining the rate of flow of the oxygen and a member of said group high enough to suspend catalyst particles above the level of the major oxygen introduction in the resulting stream of upwardly rising gases.

8. The method of claim 1 wherein the oxychlorination catalyst comprises a copper halide.

9. The method of claim 1 wherein the oxychlorination catalyst is copper chloride and potassium chloride.

10. In a method of preparing chlorinated hydrocarbons in a bed of oxychlorination catalyst particles by reacting in said bed at oxychlorination reaction temperatures a member of the group consisting of chlorine, HCl and mixtures of chlorine and HCl with oxygen and a member of the group consisting of lower aliphatic hydrocarbons containing from 1 to 4 carbon atoms and partially chlorinated derivatives thereof, the improvement comprising introducing oxygen into the bed at an intermediate level of said bed and above the level of introduction of the members of said groups into said bed, withdrawing products of the resulting reaction from the upper portion of the bed and maintaining the rate of flow of oxygen and the members of said groups high enough to suspend the catalyst particles above the level of oxygen introduction in the resulting stream of uprising gases.

11. In a method of preparing perchloroethylene and trichloroethylene in a bed of oxychlorination catalyst particles by reacting in said bed at oxychlorination reaction temperatures a member of the group consisting of chlorine, HCl and mixtures of chlorine and HCl with oxygen and ethylene, the improvement comprising introducing oxygen into the bed at an intermediate level of said bed and above the level of introduction of said member and ethylene into said bed, withdrawing products of the resulting reaction from the upper portion of the bed and maintaining the rate of flow of oxygen, the said member and ethylene high enough to suspend the catalyst particles above the level of oxygen introduction in the resulting stream of uprising gases.

12. In a method of preparing perchloroethylene and trichloroethylene in a bed of oxychlorination catalyst particles by reacting in said bed at oxychlorination reaction temperatures a member of the group consisting of chlorine, HCl and mixtures of chlorine and HCl with oxygen and 1,2-dichloroethane, the improvement comprising introducing oxygen into the bed at an intermediate level of said bed and above the level of introduction of said member and 1,2-dichloroethane into said bed, withdrawing products of the resulting reaction from the upper portion of the bed and maintaining the rate of flow of oxygen, the said member and 1,2-dichloroethane high enough to suspend the catalyst particles above the level of oxygen introduction in the resulting stream of uprising gases.

References Cited by the Examiner

UNITED STATES PATENTS

| | | | |
|---|---|---|---|
| 2,379,414 | 7/1945 | Cass | 260—654 |
| 2,498,552 | 2/1950 | Kilgren et al. | 260—662 |
| 2,783,286 | 2/1957 | Reynolds | 260—659 X |
| 2,838,577 | 6/1958 | Cook et al. | 260—656 |
| 2,952,714 | 9/1960 | Milam et al. | 260—659 X |
| 3,010,913 | 10/1961 | Price | 252—441 |

LEON ZITVER, *Primary Examiner.*

K. V. ROCKEY, *Assistant Examiner.*